United States Patent
Yamada et al.

(10) Patent No.: US 11,563,654 B2
(45) Date of Patent: Jan. 24, 2023

(54) DETECTION DEVICE AND DETECTION METHOD

(71) Applicant: NIPPON TELEGRAPH AND TELEPHONE CORPORATION, Tokyo (JP)

(72) Inventors: Masanori Yamada, Musashino (JP); Yuminobu Igarashi, Musashino (JP); Yuki Yamanaka, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/973,433

(22) PCT Filed: Jun. 7, 2019

(86) PCT No.: PCT/JP2019/022738
§ 371 (c)(1),
(2) Date: Dec. 9, 2020

(87) PCT Pub. No.: WO2019/240038
PCT Pub. Date: Dec. 19, 2019

(65) Prior Publication Data
US 2021/0250260 A1 Aug. 12, 2021

(30) Foreign Application Priority Data
Jun. 13, 2018 (JP) .............................. JP2018-113154

(51) Int. Cl.
*H04L 43/04* (2022.01)
*G16Y 40/10* (2020.01)
*G16Y 30/10* (2020.01)

(52) U.S. Cl.
CPC .............. *H04L 43/04* (2013.01); *G16Y 30/10* (2020.01); *G16Y 40/10* (2020.01)

(58) Field of Classification Search
CPC ..... G06F 21/552; G06F 21/554; G16Y 30/10; G16Y 40/10; H04L 43/04; H04L 63/1441
See application file for complete search history.

(56) References Cited

U.S. PATENT DOCUMENTS

2016/0234238 A1* 8/2016 Harutyunyan ...... H04L 63/1433
2016/0359886 A1* 12/2016 Yadav ................... H04L 41/142
(Continued)

FOREIGN PATENT DOCUMENTS

JP 2018-25936 A 2/2018
JP 2018-73258 A 5/2018
(Continued)

OTHER PUBLICATIONS

Australian Office Action dated Aug. 12, 2021 in Australian Application No. 2019287212.
(Continued)

*Primary Examiner* — Jason D Recek
(74) *Attorney, Agent, or Firm* — Xsensus LLP

(57) ABSTRACT

A detecting device obtains a network log and a host log of a device. The detecting device converts the network log into a network feature value in a form which is inputtable to a multimodal generative model which generates output data on the basis of multiple latent variables represented by random variables. The detecting device converts the host log into a host feature value in a form which is inputtable to the generative model. The detecting device also inputs at least one of the network feature value and the host feature value to the generative model and calculates output data. The detecting device detects an abnormality about the device using an anomaly score calculated on the basis of the output data.

6 Claims, 12 Drawing Sheets

(56) References Cited

U.S. PATENT DOCUMENTS

2019/0182283 A1 6/2019 Nakata
2019/0205511 A1* 7/2019 Zhan ..................... G06F 21/316

FOREIGN PATENT DOCUMENTS

KR 2003-0010263 A 2/2003
WO 2017/221711 A1 12/2017

OTHER PUBLICATIONS

Hsu WN et al "Disentangling by partitioning: A representation learning framework for multimodal sensory data" arXiv preprint arXiv:1805.11264. May 29, 2018.
An et al., "Variational Autoencoder based Anomaly Detection using Reconstruction Probability", SNU Data Mining Center, Dec. 27, 2015, pp. 1-18.
Kingma et al.,"Auto-Encoding Variational Bayes", Cornell University Library, May 1, 2014, 1 page.
Suzuki et al., "Joint Multimodal Learning with Deep Generative Models", Nov. 7, 2016, 1 page.
CERT NetSA Security Suite, "YAF", 1 page.
Kikuchi et al.,"Outlier Detection Model on the Failure Detection for IoT Home Appliance", Documents of research group of the Institute of Electrical Engineering of Japan, Mar. 22, 2018, pp. 61-65.
Extended European Search Report dated Dec. 16, 2021 in European Patent Application No. 19820281.4, 8 pages.
Mayu Sakurada, et al., "Anomaly Detection Using Autoencoders with Nonlinear Dimensionality Reduction", Machine Learning for Sensory Data Analysis, ACM, 2 Penn Plaza, Suite 701 New York NY 10121-0701 USA, Dec. 2, 2014, 8 pages, XP058063051.

* cited by examiner

Fig. 8

STATE OF DATA OBTAINED (NETWORK ABNORMALITY)

| DATA SERIES | CAMERA PICTURE QUALITY | STATE |
|---|---|---|
| NORMAL 1 | HIGH (1280x720 720p) | CAMERA DISTRIBUTION ONLY |
| ABNORMAL 1 | LOW (640x480 VGA) | CAMERA DISTRIBUTION ONLY |
| ABNORMAL 2 | LOW (640x480 VGA) | CAMERA DISTRIBUTION ONLY |

Fig. 9

ANOMALY SCORE (NETWORK ABNORMALITY)

| DATA SERIES | ANOMALY SCORE |
|---|---|
| NORMAL 1 | 497 |
| ABNORMAL 1 | 602 |
| ABNORMAL 2 | 623 |

Fig. 10

STATE OF DATA OBTAINED (HOST ABNORMALITY)

| DATA SERIES | CAMERA PICTURE QUALITY | STATE |
|---|---|---|
| NORMAL 1 | HIGH (1280x720 720p) | CAMERA DISTRIBUTION ONLY |
| ABNORMAL 1 | HIGH (1280x720 720p) | CAMERA DISTRIBUTION, 1MB FILE ENCRYPTED |
| ABNORMAL 2 | HIGH (1280x720 720p) | CAMERA DISTRIBUTION, 10MB FILE ENCRYPTED |
| ABNORMAL 3 | HIGH (1280x720 720p) | CAMERA DISTRIBUTION, 100MB FILE ENCRYPTED |

Fig. 11

ANOMALY SCORE (HOST ABNORMALITY)

| DATA SERIES | ANOMALY SCORE |
|---|---|
| NORMAL 1 | 611 |
| ABNORMAL 1 | 746 |
| ABNORMAL 2 | 776 |
| ABNORMAL 3 | 927 |

DETECTION DEVICE AND DETECTION METHOD

CROSS-REFERENCE TO RELATED APPLICATIONS

The present application is based on PCT filing PCT/JP2019/022738, filed Jun. 7, 2019, which claims priority to JP 2018-113154, filed Jun. 13, 2018, the entire contents of each are incorporated herein by reference.

TECHNICAL FIELD

The present invention relates to a detecting device and a detecting method.

BACKGROUND ART

In recent years, as IoT technology has become available, various kinds of equipment have been operated in cooperation through networks, so that various values are about to be created. Meanwhile, connecting various devices through networks can give rise to an unpredicted vulnerability. The IoT is still emerging from its infancy at present, and a large number of devices without sufficient security measures are connected to networks.

This is why IoT anomaly detection technology is important. Anomaly detectors can be divided into a list-type detector and a learning-type detector. The list type detector has its detection condition designed by a person depending on each of IoT devices. The learning-type detector learns a detection condition from data.

Since there are so many kinds of IoT devices, it is likely that learning type detectors will be the mainstream. In addition, as for detecting methods by the learning type detectors, some detectors learn a normal state and detects an abnormality on the basis of a deviation from the normal state, and other detectors learn an abnormal state and detects an abnormality on the basis of proximity to the abnormal state.

For example, an anomaly detecting method is known as a detecting method for detecting an abnormality on the basis of a deviation from a normal state, and the method uses a detecting model which has learned logs of a network in a normal state connected with an IoT device.

CITATION LIST

Non Patent Literature

[NPL 1] Jinwon An, Sungzoon Cho, "Variational Autoencoder based Anomaly Detection using Reconstruction Probability" [online], [retrieved Jun. 4, 2018], retrieved from dm.snu.ac.kr

[NPL 2] Diederik P. Kingma, Max Welling, "Auto-Encoding Variational Bayes" [online], [retrieved Jun. 4, 2018], retrieved from arxiv.org

[NPL 3] Masahiro Suzuki, Kotaro Nakayama, Yutaka Matsuo, "JOINT MULTIMODAL LEARNING WITH DEEP GENERATIVE MODELS" [online], [retrieved Jun. 4, 2018], retrieved from arxiv.org

[NPL 4] CERT NetSA Security Suite, "YAP"[online], [retrieved Jun. 4, 2018], retrieved from tools.etsa.cert.org

SUMMARY OF THE INVENTION

Technical Problem

However, according to the conventional techniques, abnormalities about IoT devices cannot be detected with high accuracy in some cases. For example, the anomaly detecting type detecting method by learning network logs may be effective in detecting abnormalities caused by DoS attacks or Arp spoofing, while the method cannot detect abnormalities caused by ransomware in some cases. This is because abnormalities caused by ransomware are unlikely to appear as abnormalities on the network side and more likely to appear as abnormalities on the host side. Conversely, the detecting method by learning host logs is effective in detecting abnormalities by ransomware but may not always be effective in detecting abnormalities caused by DoS attacks or Arp spoofing.

Effects of the Invention

According to the present invention, an abnormality about an IoT device can be detected with high accuracy.

BRIEF DESCRIPTION OF DRAWINGS

FIG. 8 is a table for illustrating effects of the first embodiment.

FIG. 9 is a table for illustrating effects of the first embodiment.

FIG. 10 is a table for illustrating effects of the first embodiment.

FIG. 11 is a table for illustrating effects of the first embodiment.

DESCRIPTION OF EMBODIMENTS

Hereinafter, a detecting device and a detecting method according to an embodiment of the present invention will be described in detail in conjunction with the accompanying drawings. Note that the present invention is not limited by the following embodiment.

Configuration of First Embodiment

Figure 1:
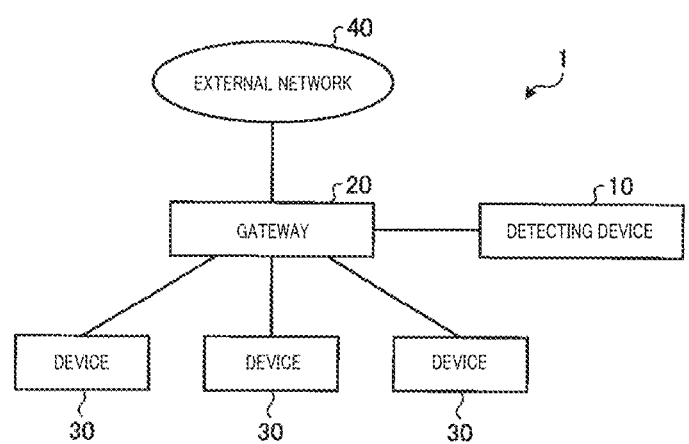
FIG. 1 is a diagram of an exemplary configuration of a detecting system according to a first embodiment of the invention.

Referring to FIG. 1, the configuration of a detecting system according to the first embodiment will be described. FIG. 1 is a diagram of an exemplary configuration of the detecting system according to the first embodiment. As shown in FIG. 1, the detecting system 1 includes a detecting device 10, a gateway 20, and a device 30, and the gateway 20 is connected with an external network 40.

For example, the detecting device 10 obtains logs of communication established between the device 30 and the external network 40 and passed through the gateway 20. For example, the detecting device 10 obtains the host logs of the device 30. The detecting device 10 also detects an abnormality about the device 30 using a generative model having learned using the obtained logs.

The device 30 is an IoT device such as a monitoring camera or a wearable device. When for example the device 30 is a monitoring camera, the detecting device 10 obtains a network log and a host log when the resolution of the monitoring camera is changed.

Figure 2:
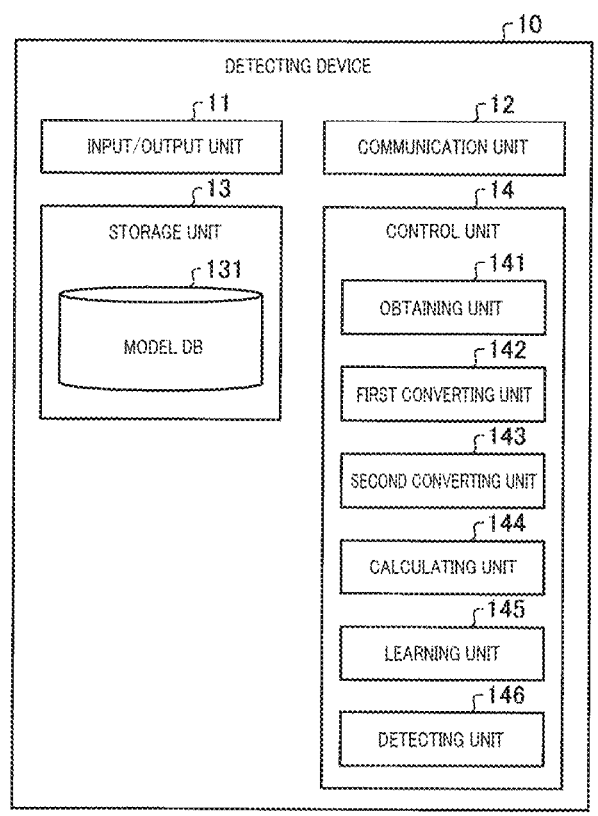
FIG. 2 is a diagram of an exemplary configuration of a detecting device according to the first embodiment.

Now, referring to FIG. 2, the configuration of the detecting device 10 will be described. FIG. 2 is a diagram of an exemplary configuration of the detecting device according to the first embodiment. As shown in FIG. 2, the detecting device 10 includes an input/output unit 11, a communication unit 12, a storage unit 13, and a control unit 14.

Figure 3:
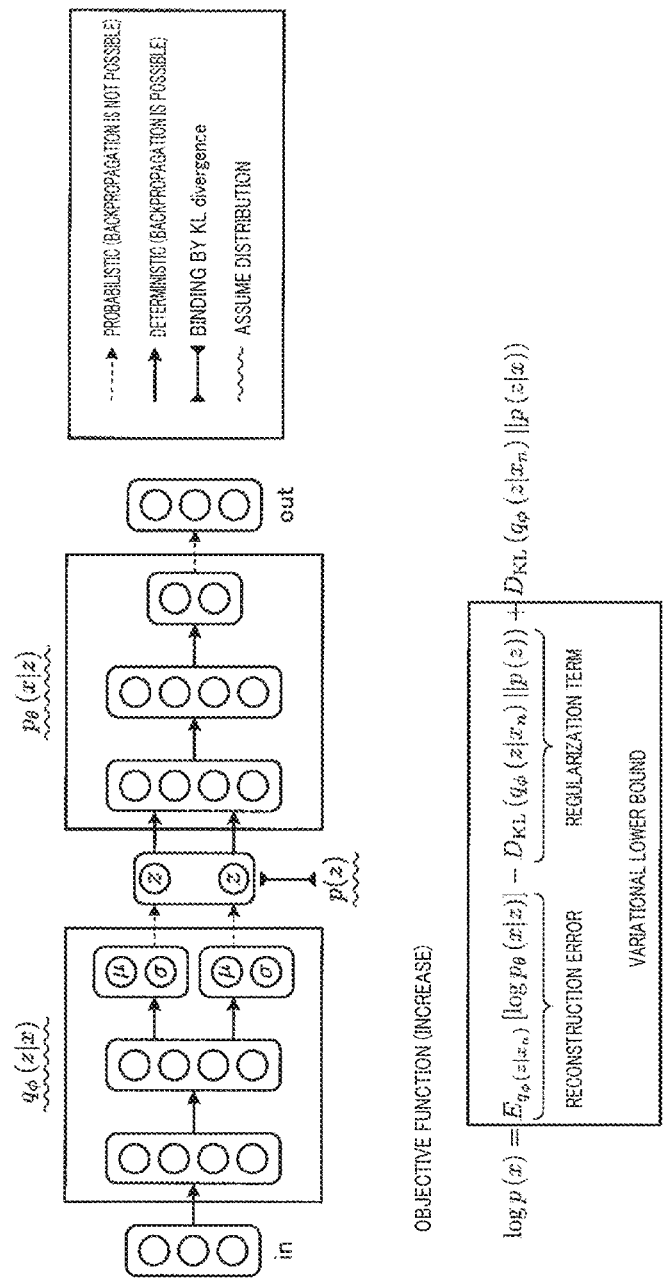
FIG. 3 is a diagram for illustrating a VAE.

Here, the detecting device 10 detects and learns using a VAE (Variational Autoencoder). Referring to FIG. 3, the VAE will be described. FIG. 3 is a diagram for illustrating the VAE.

As shown in FIG. 3, a VAE generative model is an auto-encoder. The VAE generates a latent variable $p(z)$ represented by a random variable by an encoder $q_\phi(z|x)$ on the basis of learning data input to the in-layer and output data by a decoder $p_\theta(x|z)$ on the basis of a probabilistically determined z from $p(z)$, and outputs the output data to the out-layer.

Here, the encoder $q_\phi(z|x)$, the latent variable $p(z)$, and the decoder $p_\theta(x|z)$ all assume a distribution. The relation between the encoder $q_\phi(z|x)$ and the latent variable $p(z)$ is probabilistic, and therefore backward propagation is not possible. Meanwhile, the relation between the latent variable $p(z)$ and the decoder $p_\theta(x|z)$ is deterministic, and therefore backpropagation is possible.

The VAE also learns using, as an objective function, the part of the variational lower bound, which is obtained by subtracting the regularization term that expresses the binding of $p(z)$ by KL divergence from the reconstruction error term of $\log p(x)$, so that the objective function is maximized.

The detecting device 10 according to the embodiment performs multimodal learning when performing learning by the generative model. The multimodal learning refers to learning using data from different domains, such as network logs and host logs. Note that learning using data from one domain is called single-modal learning.

Figure 4:
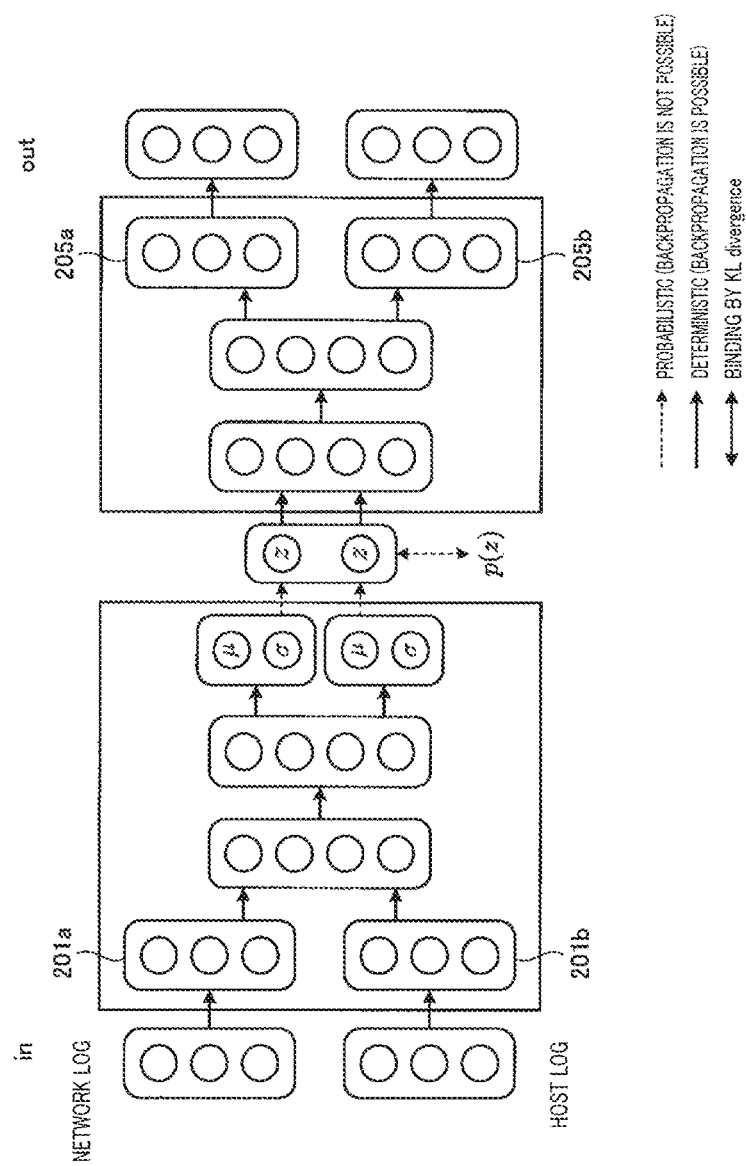
FIG. 4 is a diagram of an exemplary generative model according to the first embodiment.

Here, the multimodal generative model learning will be described with reference to FIG. 4. FIG. 4 is a diagram for illustrating an exemplary generative model according to the first embodiment. As shown in FIG. 4, the detecting device 10 may input both network log-based learning data and host log-based learning data to the generative model.

The detecting device 10 also inputs a feature value based on a network log to a layer 201a to obtain data having an abstract meaning. Meanwhile, the detecting device 10 inputs a feature value based on a host log to a layer 201b to obtain data having an abstract meaning.

When the feature value is input to the layer 201a, the detecting device 10 outputs output data through a layer 205a. Meanwhile, when the feature value is input to the layer 201b, the detecting device 10 outputs output data through a layer 205b.

More specifically, the generative model includes a neural network in which feature values obtained from data from different domains are input to layers corresponding to the domains, pieces of data output from the layers are combined in an interlayer, and data output from the interlayer is branched into layers corresponding to the domains in a layer preceding the output layers. According to the embodiment, such a generative model achieves multimodal learning by which learning data from different domains are available.

Note that the layers 201a, 201b, 205a, and 205b may each include multiple layers. In the following description, the layers 201a and 201b may be referred to as abstraction layers. The layers 205a and 205b may be referred to as materialization layers.

In the VAE, the latent variable z is calculated as $x \to z \to x$ when an input feature value is x. According to the embodiment, the latent variable z can be calculated using abstracted data regardless of the domain of the data on which the input feature value x is based.

As an example, while feature values related to the number and size of packets can be obtained from network logs, feature values related to the use amount of the CPU (Central Processing Unit) or the memory may not be obtained. Conversely, feature values related to the use amount of the CPU or the memory may be obtained from host logs, but feature values related to the number and size of packets may not be obtained. In this way, different feature values may be obtained from data from different domains.

When for example the abstraction layer converts each of feature values into data with an abstract meaning such as the "degree of infrequency" and the "degree of dispersion", feature values obtained from data from different domains may be evaluated on the basis of the same criteria. Note that the abstract meaning needs only be interpretable within the generative model and does not have to be expressed simply in a language as in the above example.

However, when the dimension numbers of the abstraction layer and the materialization layer differ significantly between domains, the domain with the larger dimension number may be emphasized in learning. Therefore, the generative model according to the embodiment is designed so that the dimensional numbers of the abstraction layer and the implementation layer are of the same order between the domains if possible. Furthermore, the detecting device 10 adjusts the dimensional numbers of input feature values according to the generative model.

Figure 5:
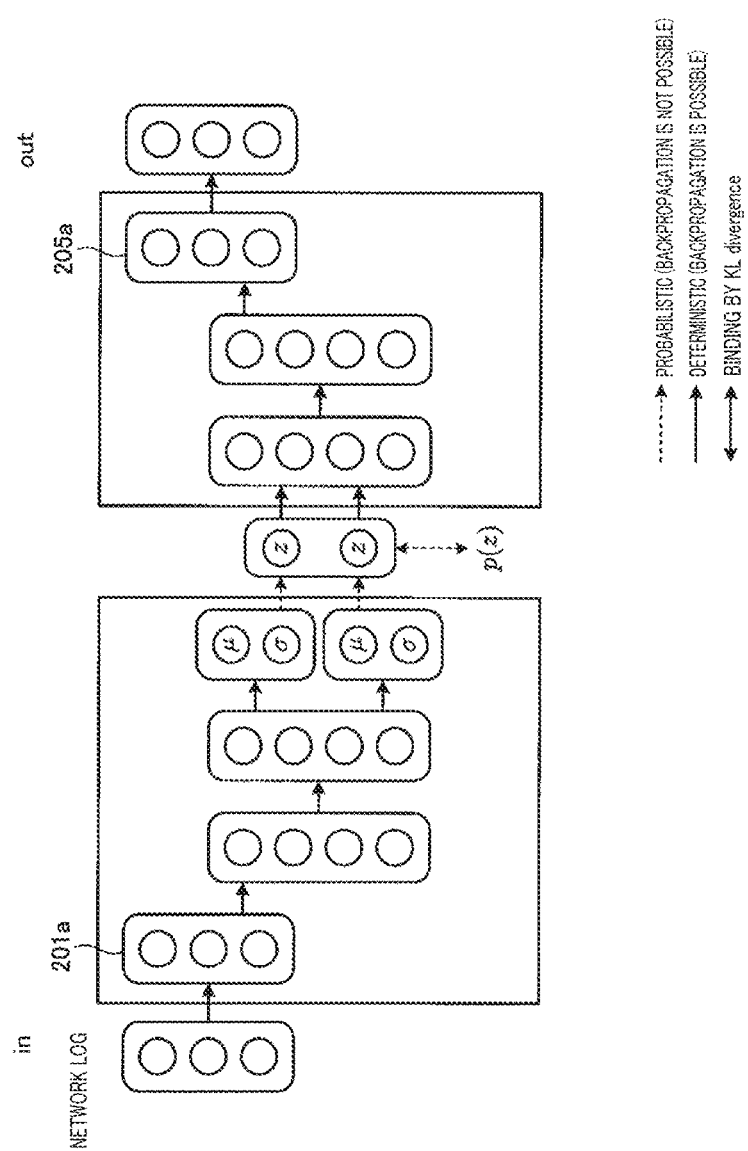
FIG. 5 is a diagram of an exemplary generative model according to the first embodiment.

As shown in FIG. 5, feature values based only on data from one domain may be input to the generative model. FIG. 5 is a diagram for illustrating an exemplary generative model according to the first embodiment. In the example shown in FIG. 5, feature values based on a network log are input, while feature values based on a host log are not input.

Referring back to FIG. 2, the input/output unit 11 receives data input from a user. The input/output unit 11 may include an input device such as a mouse device and a keyboard, and a display device such as a display and a touch panel. The communication unit 12 may perform data communication with other devices through a network. For example, the communication unit 12 is a Network Interface Card (NIC). The communication unit 12 may perform data communication with the gateway 20.

The storage unit 13 is a storage device such as an HDD (Hard Disk Drive), an SSD (Solid-State Drive), and an optical disk. The storage unit 13 may be a data-rewritable semiconductor memory such as a RAM (Random Access Memory), a flash memory, and an NVSRAM (Non-Volatile Static Random Access Memory). The storage unit 13 stores an OS (Operating System) or various programs executed by the detecting device 10. The storage unit 13 also stores various kinds of information used in executing the programs. The storage unit 13 also includes a model database (DB) 131. The model DB 131 stores for example parameters of generative models which have learned.

The control unit 14 controls the entire detecting device 10. The control unit 14 is for example an electronic circuit such as a CPU, GPU (Graphics Processing Unit), TPU (Tensor Processing Unit) and an MPU (Micro Processing Unit), or an integrated circuit such as an ASIC (Application Specific Integrated Circuit) and an FPGA (Field Programmable Gate Array). The control unit 14 has an internal memory for storing programs which specify various procedures or control data and performs various kinds of processing using the internal memory. The control unit 14 also functions as various processing units as various programs operate. For example, the control unit 14 includes an obtaining unit 141, a first converting unit 142, a second converting unit 143, a calculating unit 144, a learning unit 145, and a detecting unit 146.

The obtaining unit 141 obtains a network log and a host log of the device 30. The obtaining unit 141 may obtain a network log in the form of ipfix using YAF (Yet Another Flowmeter) (see, for example, NPL 4). The obtaining unit 141 may obtain information related to the CPU, the memory, and a disk I/O in directories such as "/proc/diskstats", "/proc/loadavg", "/proc/meminfo", and "/proc/stat" as host logs when the OS of the device 30 is Linux®.

The first converting unit 142 converts a network log into a network feature value in a form that can be input to a generative model as follows. The following generative model is a multimodal generative model which generates output data on the basis of multiple latent variables represented by random variables. Note that the network feature value is an example of a first feature value.

The first converting unit 142 can convert quantitative data included in a network log into a predetermined statistic of quantitative data. For example, quantitative data included in a network log may be the number of bytes, the number of packets, the number of flows, and the packet size in communication. The statistic may be a mean, a maximum, a minimum, a coefficient of variation, and a rate.

The first converting unit 142 can convert qualitative data included in a network log into a k-hot vector (where k is an integer equal to or greater than 1). For example, the first converting unit 142 can convert IP addresses, mac addresses, and port src and dst included in a network log into a 1-hot vector. The first converting unit 142 can also convert a protocol included in a network log into a k-hot vector. For example, when k is 2 and no. 0 and no. 3 of four protocols from no. 0 to no. 3 are included in a network log, the first converting unit 142 can express the protocol as [1, 0, 0, 1].

Exemplary network feature values are as follows. The "up" indicates the direction from the device 30 to the external network 40. The "down" indicates the direction from the external network 40 to the device 30.

The number of bytes for each of up and down
The number of packets for each of up and down
The number of flows for each of up and down
The average packet size for each of up and down
The maximum packet size for each of up and down
The minimum packet size for each of up and down
The average packet size for each of up and down
Coefficient of variation for each of up and down (each obtained by dividing the standard deviation of the average packet size by the mean of the average packet sizes)
The average flow rate for each of up and down (each obtained by dividing the number of flows by time)
The average packet rate for each of up and down (each obtained by dividing the number of packets by time)
an IP address, a mac address, and a protocol k-hot vector In this way, the first converting unit 142 can obtain a plurality of feature values by processing and combining data pieces from a network log. Therefore, the first converting unit 142 can adjust the network feature values to a predetermined dimensional number.

The second converting unit 143 converts a host log into host feature values in a form which can be input to the generative model. Note that the host feature value is an example of a second feature value. For example, the second converting unit 143 can convert data accumulated over time into an increase amount per unit time. The second converting unit 143 can also perform scale adjustment for example by logarithm. For example, the second converting unit 143 subjects the following items which can be obtained by Linux® to logarithmic scale adjustment.

SectorsRead
TimeSpentReading
SectorsWritten
TimeSpentWriting
TimeSpentDoing_I_Os
WeightedTimeSpentDoing_I_Os The second converting unit 143 converts time-series accumulated data included in the host log into data per unit time, and normalizes data related to the use amount of a resource by dividing the data by the total amount of the resource. For example, the second converting unit 143 converts a value related to the memory to 1 or less by dividing the value by Total Memory. The second converting unit 143 converts the number of processes in progress to 1 or less by dividing the number by the total number of processes.

As for the following items related the CPU use state, the second converting unit 143 also carries out conversion by dividing the sum of all the items by the value of each of the items so that the values therefor become 1 or less.

Cpu_user
Cpu_Nine
Cpu_system
Cpu_Idle
Cpu_Iowait
Cpu_Irq
Cpu_Softirq

Figure 6:
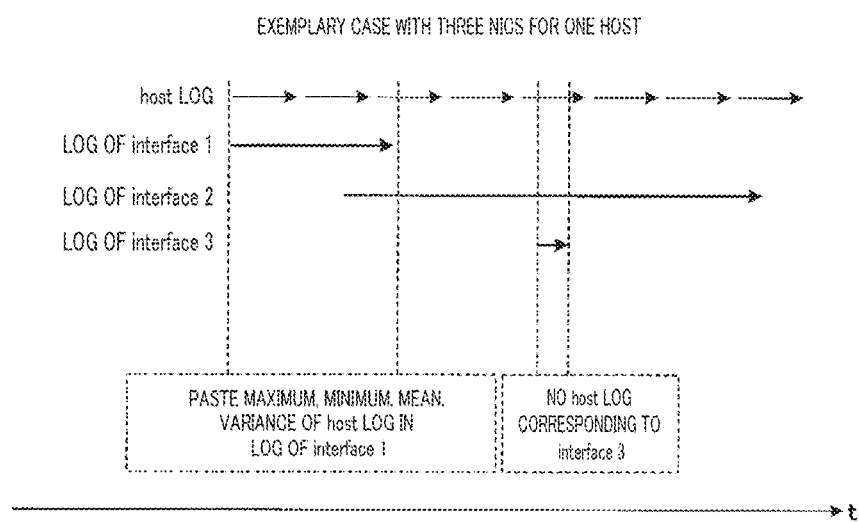
FIG. 6 is a chart for illustrating a granularity equalizing method according to the first embodiment.

Here, as shown in FIG. 6, the network log and the host log may have different output intervals and may not correspond on a one-to-one basis. In this case, the second converting unit 143 performs the processing of equalizing the granularities of the network log and the host log so that the network feature value and the host feature value correspond to each other on a one-to-one basis. FIG. 6 is a chart for illustrating a granularity equalizing method according to the first embodiment.

When a plurality of host logs correspond to one network log, the second converting unit 143 converts the plurality of host logs to one host feature value by calculating at least one of the maximum, minimum, mean, and variance of elements of the plurality of host logs. Network logs have different output intervals depending on the interface for output.

In the example in FIG. 6, since the network log for the interface 1 corresponds to two host logs, the second converting unit 143 converts the two host logs into one host feature value by calculating at least one of the maximum, minimum, average, and variance of the elements of the two host logs.

Meanwhile, since there is no corresponding host log (less than one) for the network log for the interface 3, the second converting unit 143 does not carries out conversion into a host feature value. In this case, only the network feature value is input to the generative model.

The calculating unit 144 inputs at least one of the network feature value and the host feature value to the generative model and calculates output data. The processing by the calculating unit 144 provides the output data corresponding to the input data. Here, the detecting device 10 performs the following processing on the basis of the degree of similarity between the input data and the output data.

The learning unit 145 has the generative model learn so that the difference between the output data and a feature value each input to the generative model is reduced. Specifically, the learning unit 145 updates the parameters of p(z) so that log p(x) in FIG. 3 is optimized.

The detecting unit 146 detects an abnormality about the device 30 using an anomaly score calculated on the basis of the output data. For example, the detecting unit 146 sets the value of log p(x) in FIG. 3 as an anomaly score, and when the anomaly score exceeds a threshold value, it can be determined that there is an abnormality about the device 30.

Processing According to First Embodiment

Figure 7:
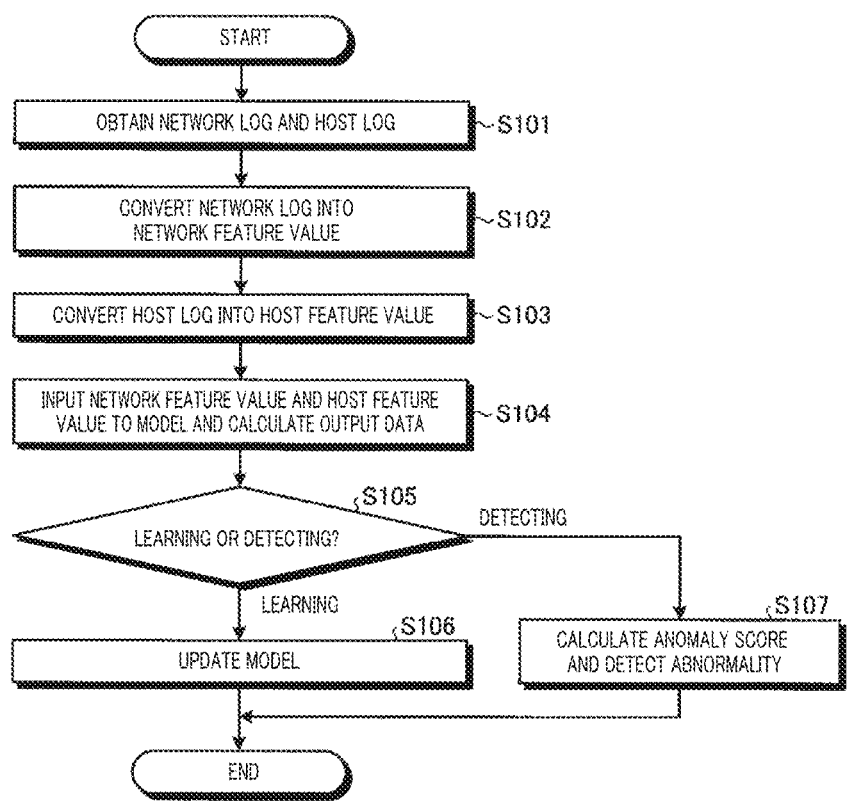
FIG. 7 is a flowchart for illustrating the flow of processing by the detecting device according to the first embodiment.

Referring to FIG. 7, the processing by the detecting device 10 will be described. FIG. 7 is a flowchart for illustrating the flow of processing by the detecting device according to the first embodiment. As shown in FIG. 7, the detecting device 10 obtains a network log and a host log of the device 30 to start with (step S101).

Then, the detecting device 10 converts the network log into a network feature value (step S102). The detecting device 10 also converts a host log into a host feature value (step S103). The detecting device 10 then inputs the network feature value and the host feature value to the model and calculates output data (step S104).

Here, when learning is performed (step S105, learning), the detecting device 10 updates the model on the basis of the output data (step S106). Meanwhile, when detection is performed (step S105, detection), the detecting device 10 detects an abnormality using an anomaly score calculated from the output data (step S107).

Effects of First Embodiment

According to the first embodiment, the detecting device 10 obtains a network log and a host log of the device 30. The detecting device 10 converts the network log into a network feature value in a form which can be input to a generative model as follows. The generative model is a multimodal generative model which generates output data on the basis of multiple latent variables represented by random variables. The detecting device 10 also converts the host log into a host feature value in a form which can be input to the generative model. The detecting device 10 also inputs at least one of the network feature value and the host feature value to the generative model and calculates output data. The detecting device 10 also detects an abnormality about the device 30 using an anomaly score calculated on the basis of the output data. In this way, the detecting device 10 detects an abnormality using feature values converted from both the network log and the host log and can therefore detect abnormalities about an IoT device with high accuracy. For example, the detecting device 10 can detect abnormalities caused both by DoS attacks and Arp spoofing and by ransomware.

The detecting device 10 can also have the generative model learn so that the difference between the output data and each feature value input to the generative model is reduced. In this way, the detecting device 10 can further perform learning by the model used for detection.

The detecting device 10 can also convert quantitative data included in a network log into a predetermined statistic of quantitative data and can convert qualitative data included in a network log into a k-hot vector (where k is an integer equal to or greater than 1). In this way, the detecting device 10 can adjust the dimensional numbers of the feature values.

The detecting device 10 also converts time-series accumulated data included in a host log into data per unit time and normalizes data related to the use amount of a resource by dividing the data by the total amount of the resource. In this way, the detecting device 10 can normalize the data and adjust the dimensional numbers of the feature values.

When a plurality of host logs correspond to one network log, the detecting device 10 can also convert the plurality of host logs into a single host feature value by calculating at least one of the maximum, minimum, mean, and variance of elements of the plurality of host logs. In this way, the detecting device 10 can equalize the granularities of the network feature value and the host feature value.

Here, referring to FIGS. 8 to 11, the results of experiments performed using the detecting device 10 according to the first embodiment and the effects of the embodiment will be described. FIGS. 8 to 11 are tables for illustrating the effects of the first embodiment.

In the experiments, the device 30 is assumed to be a rasberry pi as a small computer equipped with a camera for shooting moving images. Also in the experiments, a network log and a host log obtained during video streaming using the device 30 were used as data in a normal state.

To start with, the results of simulating network abnormalities by changing the picture quality of moving video during streaming by the device 30 are shown in FIGS. 8 and 9. The quality of the video image was changed from high image quality to low image quality, an anomaly score was calculated from the network log and the host log obtained by the detecting device 10 at the time, and as shown in FIGS. 8 and 9, the anomaly score increased in response to the change.

Then, the results of simulating ransomware by performing file encryption during streaming by the device 30 are shown in FIGS. 10 and 11. The size of the file to be encrypted increased from the non-encrypted state, and as the result of calculating an anomaly score from a network log and a host log obtained at the time by the detecting device 10, an anomaly score increased as the size increased as shown in FIGS. 10 and 11.

In this way, the anomaly score calculated by the detecting device 10 according to the first embodiment increases in response to an abnormality occurring in the device 30. At the time, when an appropriate threshold value is set, an abnormality can be detected by the detecting device 10.

[System Configuration, etc.]

In addition, the components of each of the illustrated devices represent functional concepts and do not have to be physically configured as illustrated. In other words, the specific forms of distribution and integration of the devices are not limited to the shown examples and can be, in whole or part, functionally or physically distributed and integrated in arbitrary units depending on various loads, use conditions, and the like. Furthermore, the processing functions performed in the devices, in whole or part, may be implemented by a CPU and a program to be analyzed and executed in the CPU or may be implemented as hardware by wired logic.

In the description of the embodiment, among the various kinds of processing, those automatically performed, in whole or part, may also be performed manually. Or, those performed manually, in whole or part, may be performed automatically in a known manner. In addition, information including processing procedures, control procedures, specific names, various kinds of data, and parameters described and shown in the description and drawings may be optionally changed unless otherwise specified.

[Program]

According to one embodiment, the detecting device 10 may be implemented by installing, on a desired computer, a detecting program for performing the above-described detection as package software or on-line software. For example, as the detecting program is executed by the information processing device, an information processing device is allowed to function as the detecting device 10. The information processing device herein may include a desktop type or notebook type personal computer. Examples of other information processing devices include a mobile communication terminal such as a smartphone, a mobile phone, and a PHS (Personal Handy-phone System), and a slate terminal such as a PDA (Personal Digital Assistant).

The detecting device 10 may also be implemented as a detecting server device which provides services related to detection described above to a terminal device used by the user as a client. For example, the detection server device may be implemented as a server device which provides a detection service in which a network log and a host log are an input and a detection result is an output. In this case, the detection server device may be implemented as a web server or may be implemented as a cloud which provides the above detection service by outsourcing.

Figure 12:
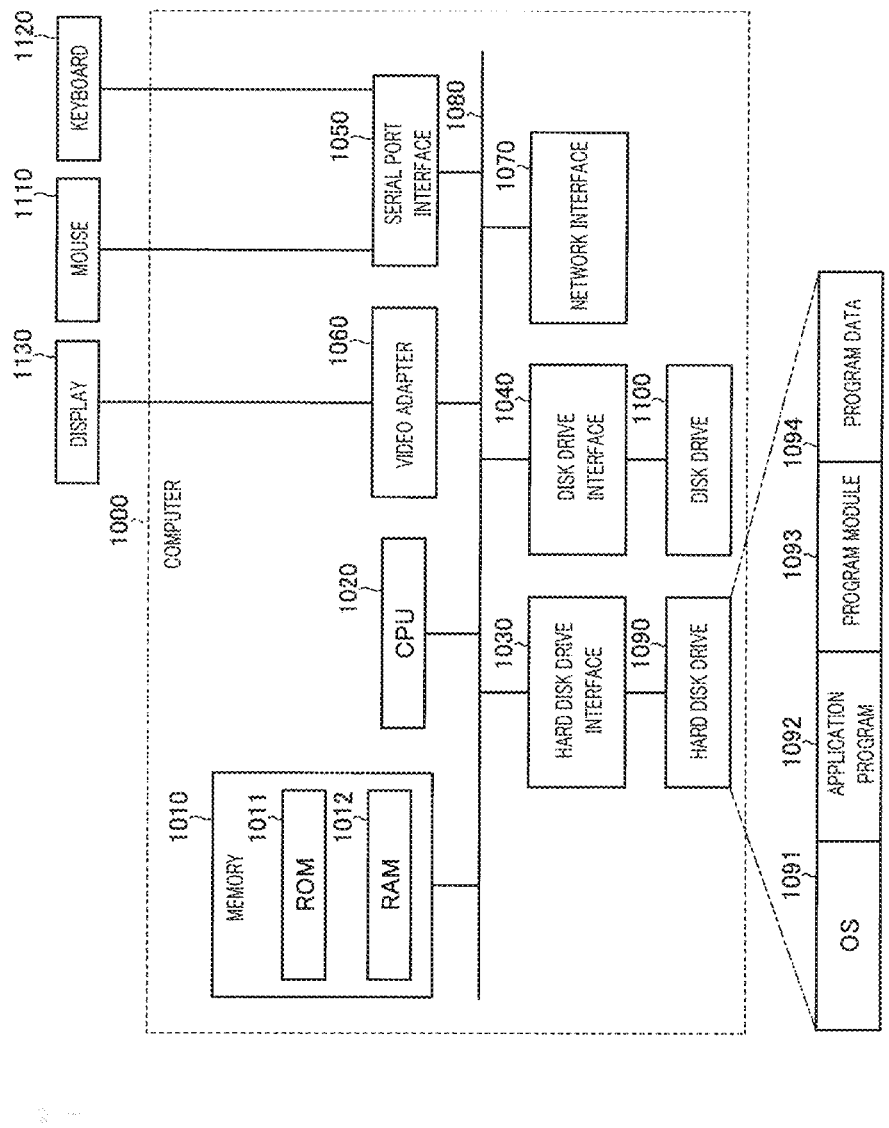
FIG. 12 is a diagram of an exemplary computer which executes a detecting program.

FIG. 12 is a diagram for illustrating an exemplary computer which executes a detection program. For example, the computer 1000 includes a memory 1010 and a CPU 1020. The computer 1000 also includes a hard disk drive interface 1030, a disk drive interface 1040, a serial port interface 1050, a video adapter 1060, and a network interface 1070. These components are connected by a bus 1080.

The memory 1010 includes a ROM (Read Only Memory) 1011 and a RAM 1012. The ROM 1011 stores a boot program such as a BIOS (Basic Input Output System). The hard disk drive interface 1030 is connected to a hard disk drive 1090. The disk drive interface 1040 is connected to a disk drive 1100. A removable storage medium such as a magnetic disk and an optical disk is inserted into the disk drive 1100. The serial port interface 1050 is for example connected to a mouse device 1110 and a keyboard 1120. The video adapter 1060 is for example connected to a display 1130.

The hard disk drive 1090 stores for example an OS 1091, an application program 1092, a program module 1093, and program data 1094. More specifically, the program defining each kind of processing by the detecting device 10 is implemented as the program module 1093 in which a code executable by the computer is described. The program module 1093 is stored for example in the hard disk drive 1090. For example, the program module 1093 for executing processing identical to the functional configuration of the detecting device 10 is stored in the hard disk drive 1090. The hard disk drive 1090 may be replaced by an SSD.

Then, the setting data used in the processing according to the above-described embodiment is stored as the program data 1094 for example in the memory 1010 or the hard disk drive 1090. The CPU 1020 then reads out the program module 1093 or the program data 1094 stored in the memory 1010 or the hard disk drive 1090 into the RAM 1012 for execution as needed.

Note that the program module 1093 and the program data 1094 may be stored in a removable storage medium and read out by the CPU 1020 for example through the disk drive 1100 rather than being stored in the hard disk drive 1090. Alternatively, the program module 1093 and the program data 1094 may be stored in another computer connected over a network (such as LAN (Local Area Network) and WAN (Wide Area Network)). The program module 1093 and the program data 1094 may then be read out from the computer by the CPU 1020 through the network interface 1070.

REFERENCE SIGNS LIST

10 Detecting device
11 Input/output unit
12 Communication unit
13 Storage unit
14 Control unit
20 Gateway
30 Device
40 External network
141 Obtaining unit
142 First converting unit
143 Second converting unit
144 Calculating unit
145 Learning unit
146 Detecting unit

The invention claimed is:

1. A detecting device, comprising:
a memory; and
a processor coupled to the memory and programmed to execute a process comprising: obtaining a network log and a host log of a device; firstly converting the network log into a first feature value in a form which is inputtable to a multimodal generative model, the multimodal generative model being a generative model which generates output data on the basis of multiple latent variables represented by random variables; secondly converting the host log into a second feature value in a form which is inputtable to the generative model; inputting at least one of the first and second feature values to the generative model; calculating the output data; and detecting an abnormality about the device using an anomaly score calculated on the basis of the output data, wherein
the network log and the host log have different output intervals, and the network log is one of a plurality of network logs that have different output intervals depending on an interface for output, and
the secondly converting includes performing a processing of equalizing granularities of the network log and the host log so that a network feature value and a host feature value correspond to each other on a one-to-one basis.

2. The detecting device according to claim 1, further comprising having the generative model learn so that the difference between the output data and each of the feature values input to the generative model is reduced.

3. The detecting device according to claim 1, wherein the firstly converting converts quantitative data included in the network log into a prescribed statistic of the quantitative data and qualitative data included in the network log into a k-hot vector included in the network log where k is an integer of at least 1.

4. The detecting device according to claim 1, wherein the secondly converting converts time-series accumulated data included in the host log into data per unit time and normalizes data related to the use amount of a resource by dividing the data by the total amount of the resource.

5. The detecting device according to claim 1, wherein when a plurality of host logs correspond to one network log, the secondly converting converts the plurality of host logs into the second feature value as one feature value by calculating at least one of a maximum, a minimum, a mean, and a variance of elements of the plurality of host logs.

6. A detecting method executed by a computer, comprising:
   obtaining a network log and a host log from a device;
   firstly converting the network log into a first feature value in a form which is inputtable to a multimodal generative model which generates output data on the basis of multiple latent variables represented by random variables; and
   secondly converting the host log into a second feature value in a form which is inputtable to the generative model, wherein
   the network log and the host log have different output intervals, and the network log is one of a plurality of network logs that have different output intervals depending on an interface for output, and
   the secondly converting includes performing a processing of equalizing granularities of the network log and the host log so that a network feature value and a host feature value correspond to each other on a one-to-one basis.

* * * * *